(12) United States Patent
Iizuka

(10) Patent No.: US 6,721,009 B1
(45) Date of Patent: *Apr. 13, 2004

(54) METHOD OF DRIVING SOLID STATE IMAGING DEVICE

(75) Inventor: Tetsuya Iizuka, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1572 days.

(21) Appl. No.: 08/556,427

(22) Filed: Nov. 9, 1995

(30) Foreign Application Priority Data

Nov. 12, 1994 (JP) ............................................ P 6-302847

(51) Int. Cl.⁷ ............................ H04N 5/335; H04N 9/64
(52) U.S. Cl. ........................ 348/314; 348/311; 348/243
(58) Field of Search .......................... 348/31, 314, 322, 348/441, 445, 243

(56) References Cited

U.S. PATENT DOCUMENTS

| | | | | |
|---|---|---|---|---|
| 4,910,599 A | * | 3/1990 | Hashimoto | 348/240 |
| 4,980,771 A | * | 12/1990 | Ueda et al. | 348/323 |
| 5,036,397 A | | 7/1991 | Nagabusa | |
| 5,196,939 A | * | 3/1993 | Elabd et al. | 348/314 |
| 5,216,512 A | * | 6/1993 | Bruijns et al. | 348/335 |
| 5,287,192 A | * | 2/1994 | Iizuka | 348/311 |
| 5,450,129 A | * | 9/1995 | Matoba et al. | 348/294 |
| 5,486,859 A | * | 1/1996 | Matsuda | 348/311 |
| 5,491,512 A | * | 2/1996 | Itakura et al. | 348/321 |
| 5,502,484 A | * | 3/1996 | Okada | 348/208 |
| 5,629,744 A | * | 5/1997 | Kawamura | 348/800 |

FOREIGN PATENT DOCUMENTS

| | | |
|---|---|---|
| EP | 0 282 993 A2 | 9/1988 |
| EP | 0 454 292 A2 | 10/1991 |
| EP | 0 547 697 A2 | 6/1993 |
| EP | 0 574 228 A1 | 12/1993 |
| JP | 3-32176 * | 2/1991 ... H04N/5/335 |

* cited by examiner

*Primary Examiner*—Aung Moe
(74) *Attorney, Agent, or Firm*—Sonnenschein, Nath & Rosenthal LLP

(57) ABSTRACT

An aspect ratio variable solid state imaging device capable of reducing the frequency of a drive pulse of a horizontal register required for discharging signal charges in unnecessary portions at a small aspect ratio or of reducing a discharge period for signal charges in unnecessary portions in each horizontal period. In the mode of a small aspect ratio, in the horizontal blanking period, signal charges in the right side unnecessary portion on one line is mixed with signal charges in the right side unnecessary portion for the next line at the output end section of the horizontal register, and then the mixed signal charges are transferred to be discharged in the horizontal blanking period. In the horizontal transfer period, signal charges in the middle portion is horizontally transferred.

10 Claims, 9 Drawing Sheets

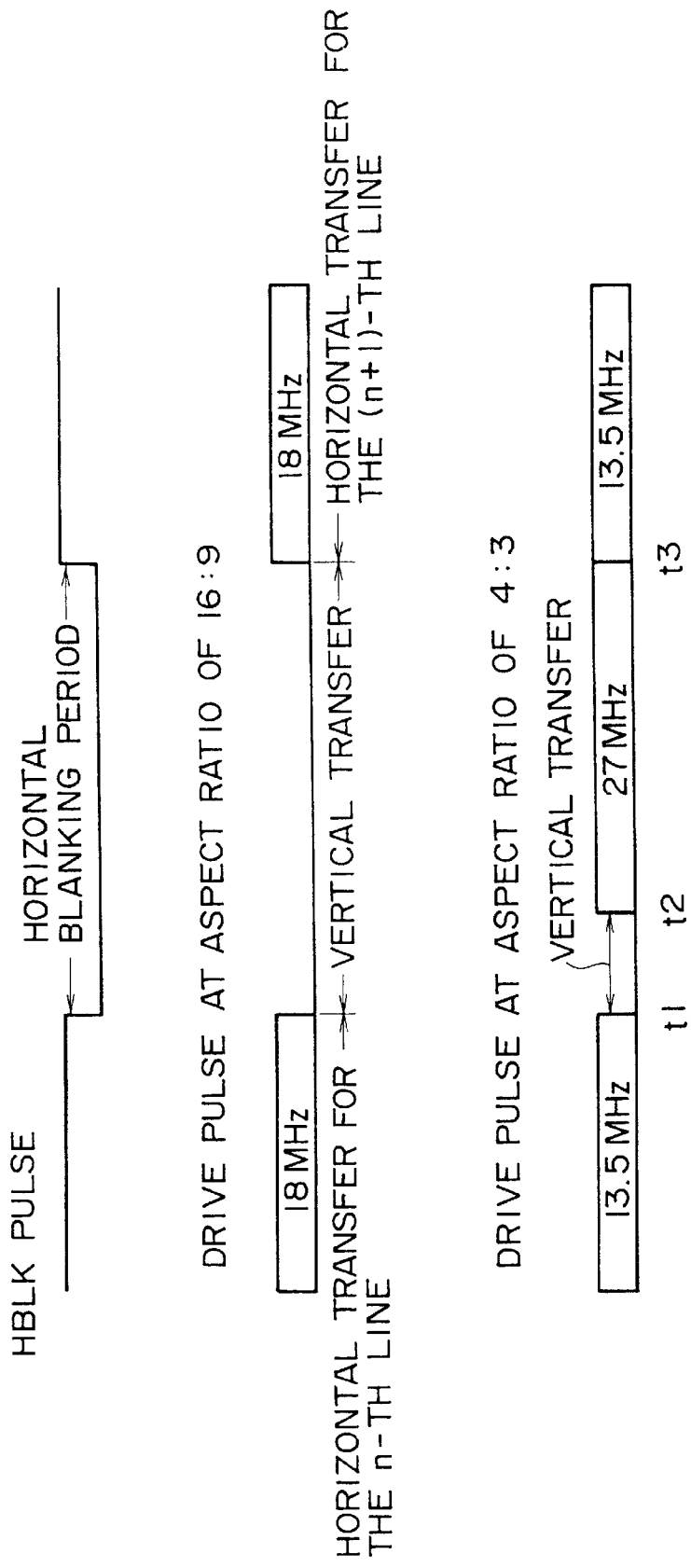

FIG. 1C
1) t1~t2
OUTPUT SIDE
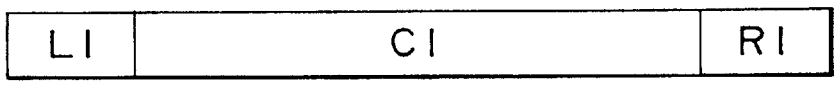
↓ DRIVE AT 27 MHz
2) t3
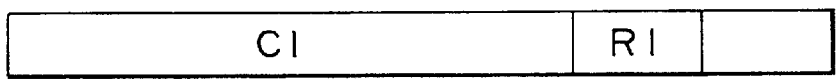
↓ DRIVE AT 13.5 MHz
3) t1
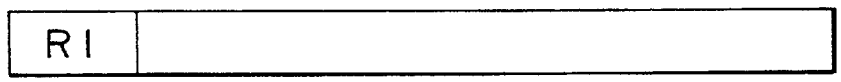
4) t1~t2
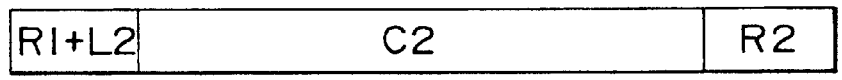
↓ DRIVE AT 27 MHz
5) t3

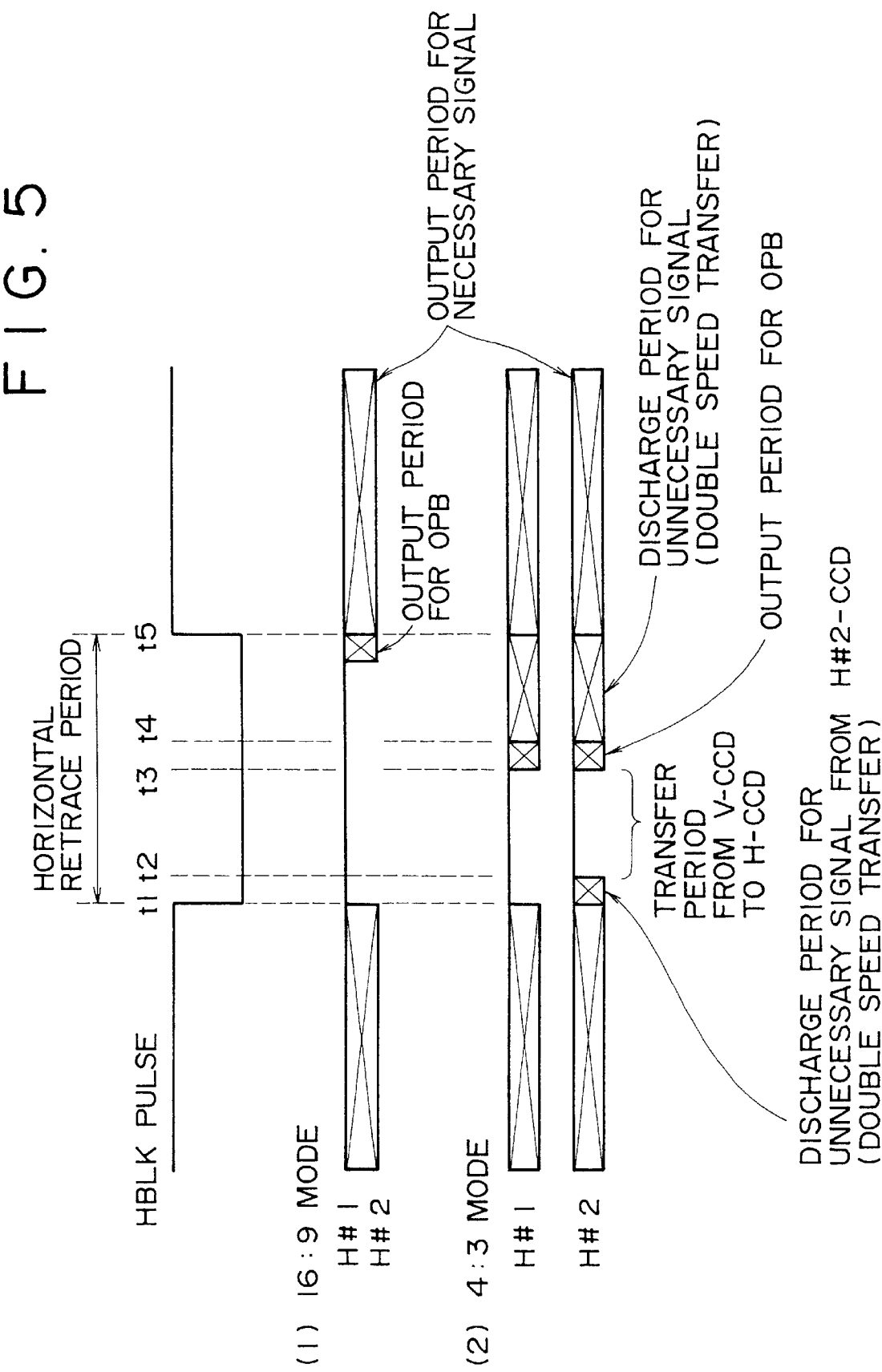

FIG. 6B
PRIOR ART
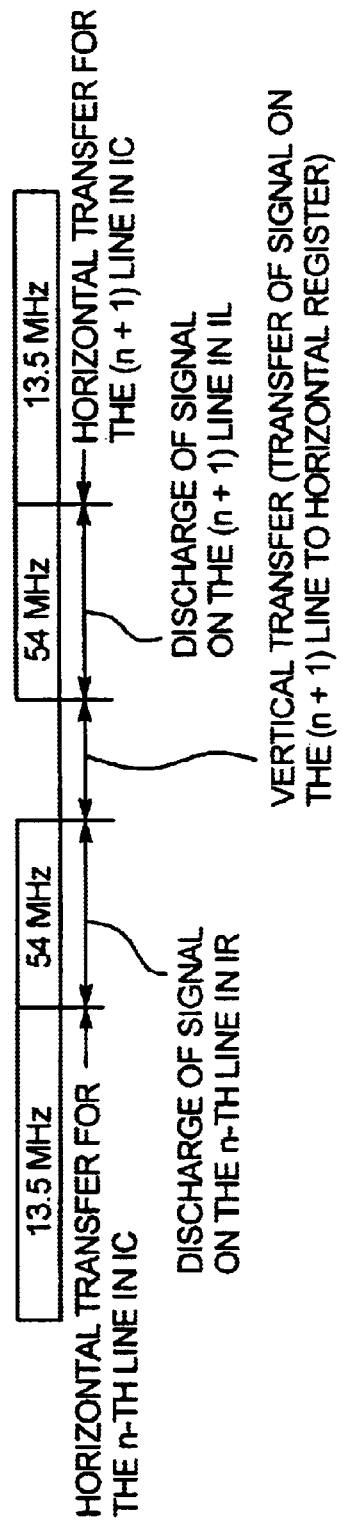

METHOD OF DRIVING SOLID STATE IMAGING DEVICE

BACKGROUND OF THE INVENTION

1. Field of the Invention

The present invention relates to a method of driving a solid state imaging device, and particularly to a method of driving an aspect ratio variable solid state imaging device. Specifically, the aspect ratio variable solid state imaging device includes an image area having light receiving elements arranged in a matrix in accordance with a specified aspect ratio (for example, 16:9) and vertical registers for vertically transferring signal charges in respective vertical lines of the light receiving elements, and at least one horizontal register for horizontally transferring signal charges transferred from respective vertical registers. In this imaging device, a signal according to the above aspect ratio (for example 16:9) is outputted in a usual manner while a signal according to another aspect ratio (for example, 4:3) smaller than the above aspect ratio can be also outputted by discharging signal charges in right and left unnecessary portions in the image area in a horizontal blanking period.

2. Description of the Related Art

The television broadcasting is mainly carried out at an aspect ratio of 4:3 at present. However, high definition broadcasting at an aspect ratio of 16:9 is also carried out, and a television receiver for receiving high definition broadcasting tends to be popularized. In addition, a television receiver called a wide vision which reproduces high definition broadcasting at an image quality slightly lower than the original high image quality of the high definition broadcasting is also extensively used because of its low cost. In other words, television receivers different in aspect ratio are present in the market and homes. As a result, a video camera and the like have been required to be matched with the above two aspect ratios.

To meet such a requirement, there has been known a technique applied to a CCD solid state imaging device used for a video camera as imaging means, wherein light receiving elements and the like are arranged in an image area in accordance with an aspect ratio of 16:9. When a signal is outputted at the 16:9 mode, the imaging device is read out in a usual manner, that is, signal charges from effective pixels in the image area are all read out. On the other hand, when a signal is outputted at an aspect ratio of 4:3, signal charges in right and left unnecessary portions in the image area (each side portion having a width of being about one-eighth of the total width of the image area) are discarded by the function of the solid state imaging device.

Such a prior art aspect ratio variable CCD solid state imaging device is shown in FIGS. 6A and 6B. FIG. 6A is a plan view showing the schematic configuration of the solid state imaging device, and FIG. 6B is a time chart showing a horizontal blanking pulse, and a horizontal drive pulse for driving a horizontal register.

In these figures, reference numeral 1 designates an image area in which light receiving elements 2, . . . , 2 constituting pixels are arranged in a matrix. Reference numeral 3 designates a vertical register provided in the image area 1 for each vertical line of the light receiving elements, which is adapted to vertically transfer signal charges from the light receiving elements in each vertical line.

The light receiving elements 2, . . . , 2 and the vertical registers 3, . . . , 3 are arranged in the image area 1 in accordance with an aspect ratio of 16:9. In this example, specifically, the number of effective pixels in the horizontal direction is 948, while the number of effective pixels in the vertical direction is 486. The effective pixels in the number of 948×486 are all to be reproduced when the solid state imaging device is used at the aspect ratio of 16:9. On the other hand, when the solid state imaging device is used at the aspect ratio of 4:3, signal charges in a left side unnecessary portion 1L and a right side unnecessary portions 1R in the image area are discharged, that is, they are not outputted as signals for the solid state imaging device. The signal charges from a middle portion (necessary portion) 1C are not discharged even when the solid state imaging device is used at the aspect ratio of 4:3.

It is to be noted that in FIG. 6A, the light receiving elements 2, . . . , 2 and the vertical registers 3, . . . , 3 are shown to be present only in the middle portion 1C; however, they are actually arranged at the same pitches in the left side unnecessary portion 1L and the right side unnecessary portion 1R. Each of the left side unnecessary portion 1L and the right side unnecessary portion 1R has a width being about one-eighth of the total width of the image area 1; while the middle portion 1C has a width being about three-fourth of the total width of the image area 1.

Reference numeral 4 designates a horizontal register for transferring signal charges vertically transferred from the vertical registers 3, . . . , 3 in the horizontal direction. The horizontal register 4 may be provided either on the upper side or on the lower side of the image area 1, and in this embodiment, it is provided on the lower side of the image area 1. Reference numeral 5 designates an output section provided on the output end side of the horizontal register 4 for converting signal charges into electrical signals (voltages). The output section 5 also serves as means for discharging unnecessary signal charges outputted from the horizontal register 4.

Next, the operation of the CCD solid state imaging device will be described with reference to FIG. 6B.

In the mode of the aspect ratio of 16:9, horizontal transfer is carried out by the horizontal register 4 during the horizontal scanning period in the same manner as in the usual CCD solid state imaging device. At this time, the frequency of a horizontal drive pulse for driving the horizontal register 4, that is, a horizontal drive frequency is, for example, 18 MHz. Then, during a horizontal blanking period, vertical transfer, that is, transfer of signal charges by the vertical registers 3, . . . , 3 in the vertical direction is carried out. By such one vertical transfer, signal charges in the vertical registers 3, . . . , 3 on one horizontal line are transferred into the horizontal register 4.

In the mode of the aspect ratio of 4:3, the operation is complicated more than the 16:9 mode. During the horizontal scanning period, signal charges in the middle portion 1C of the image area 1, that is, only the necessary signal charges are horizontally transferred and outputted. Then, during the horizontal blanking period, signal charges in the right side unnecessary portion 1R are discharged, followed by vertical transfer, and signal charges in the left side unnecessary portion 1L are discharged. Specifically, signal charges in the necessary portion 1C for the n-th horizontal line are first transferred. Subsequently, during the horizontal blanking period, signal charges in the right side unnecessary portion 1R for the n-th horizontal line are discharged, followed by vertical transfer for transferring signal charges for the (n+1)-th horizontal line into the horizontal register 4, and signal charges in the left side unnecessary portion 1L for the (n+1)-th line are discharged.

In summary, during the horizontal blanking period, drive of the horizontal register, vertical transfer, and drive of the horizontal register must be carried out.

After the above horizontal blanking period is ended, that is, in the subsequent horizontal scanning period, signal charges in the necessary portion 1C for the (n+1)-th line are horizontally transferred. It is to be noted that in the 4:3 mode, the frequency of the horizonal drive pulse of the horizontal register 4 in the horizontal scanning period, that is, the horizontal drive frequency is 13.5 MHz, and the frequency of the horizontal drive pulse for discharging signal charges in the horizontal blanking period is, for example, 54 MHz.

The above-described prior art aspect ratio variable CCD solid state imaging device has a disadvantage that in the 4:3 mode, the horizontal register 4 must be driven at a high speed for discharging signal charges in the unnecessary portion. Specifically, the horizontal drive frequency is only 18 MHz for the CCD solid state imaging device specialized for the 16:9 mode, and only 13.4 MHz for the CCD solid state imaging device specialized for the 4:3 mode. In the case of the aspect ratio variable CCD solid state imaging device, however, the horizontal register 4, when used in the 4:3 mode, must be driven at a very high speed, for example, at 54 MHz for discarding signal charges in the unnecessary portion during the horizontal blanking period. This presents inconveniences in that unnecessary radiation is increased; transfer speed of the horizontal register is made higher; power consumption of the horizontal register is enlarged; and a fraction defective in transfer of the horizontal register is increased.

More specifically, the higher the frequency of the drive pulse, the more the unnecessary radiation, and the increased unnecessary radiation exerts adverse effect on the interior and exterior of the CCD solid state imaging device and it also increases power consumption of the horizontal register. As a result, it is required to prevent the drive frequency from being increased or to reduce a ratio of a term in which the drive frequency is high relative to one horizontal period.

In general, the increased transfer speed tends to cause a failure in transfer of the horizontal register, and accordingly, to prevent the generation of a failure in the horizontal register even at a high transfer speed, a very high performance is required for the horizontal register. The horizontal register capable of satisfying such a high performance is difficult to be obtained. For these reasons, it is required to lower the horizontal drive frequency of the horizontal register for avoiding such inconveniences.

In actually, such a technique as to meet the above requirement has been not known.

SUMMARY OF THE INVENTION

A primary object of the present invention is to provide a method of driving a solid state imaging device capable of solving the above-described problems in the prior art. Specifically, the solid state imaging device of the present invention includes an image area having light receiving elements arranged in a matrix in accordance with a specified aspect ratio and vertical registers for vertically transferring signal charges in respective vertical lines of the light receiving elements, and at least one horizontal register for horizontally transferring signal charges transferred from respective vertical registers. In this imaging device, a signal according to the above aspect ratio is outputted in a usual manner while a signal according to another aspect ratio smaller than the above aspect ratio can be also outputted by discharging signal charges in right and left unnecessary portions in the image area in a horizontal blanking period.

A specific object of the present invention is to provide a method of driving the above solid state imaging device, which is capable of lowering the frequency of a drive pulse of the horizontal register for discharging signal charges in the unnecessary portion at a small aspect ratio or shortening a term of discharging signal charges in the unnecessary portion in each horizontal period.

Another specific object of the present invention is to provide a method of driving the above solid state imaging device, which is capable of detecting a black level for each horizontal period.

To achieve the above objects, according to a preferred mode of the present invention, there is provided a method of driving a solid state imaging device, wherein a signal at a small aspect ratio is outputted by the steps of horizontally transferring signal charges in a necessary portion for the n-th line; horizontally transferring signal charges in an unnecessary portion on the side far from the output end of a horizontal register for the n-th line up to an output end section of the horizontal register; in a horizontal blanking period, transferring signal charges for the (n+1)-th line into the horizontal register by vertical transfer through vertical registers, thereby mixing the signal charges in the unnecessary portion on the side far from the output end of the horizontal register for the n-th line with signal charges in an unnecessary portion on the side near the output end of the horizontal register for the (n+1)-th line; discharging the mixed signal charges in the unnecessary portions from the horizontal register during the horizontal blanking period; and transferring and outputting signal charges in the necessary portion for the (n+1)-th line.

In this method, at the small aspect ratio, signal charges in an unnecessary portion on the side far from the output end of a horizontal register for the n-th line is mixed with signal charges in an unnecessary portion on the side near the output end of the horizontal register on the (n+1)-th line, and then the mixed signal charges are discharged. Accordingly, there can be eliminated horizontal transfer for discharging signal charges in an unnecessary portion directly after starting each horizontal blanking period, that is, horizontal transfer in the front side of the horizontal blanking period, which has been carried out in the prior art method of driving an aspect ratio variable solid state imaging device. In the present invention, horizontal transfer for discharging signal charges in unnecessary portions may be carried out only at the rear side of the horizontal blanking period.

Accordingly, the horizontal drive frequency can be significantly reduced, for example, to be half, or a time required for transferring the horizontal register at a high speed for discharging signal charges in an unnecessary portion in each horizontal blanking period can be significantly reduced, for example, to be half.

With this configuration, it becomes possible to reduce unnecessary radiation; to lower the probability in generating a failure in transfer of the horizontal register; to eliminate the necessity of excessively increasing a high speed transfer performance of the horizontal register; and to shorten a generating time of unnecessary radiation in each horizontal period.

According to another preferred mode of the present invention, there is provided a method of driving a solid state imaging device, wherein a drain region is provided in the horizontal register on the side opposite to the image area. When a signal in accordance with a small aspect ratio is outputted, part or all of signal charges mixed at the output end section of the horizontal register are discharged in the drain region.

In this method, transfer for discharging signal charges in unnecessary portions by the horizontal register may be carried out only at the rear side of the horizontal blanking period, and further since at least part of signal charges in unnecessary portions are discharged into the drain region, the amount of signal charges in the unnecessary portions required to be transferred by the horizontal register can be controlled not to exceeds the allowable value of the horizontal register.

Specifically, in the case where the drain region is not provided, since in the present invention signal charges in the right side unnecessary portion on one line is mixed with signal charges on the left side unnecessary portion for the next line, the amount of the mixed signal charges stored in the horizontal register becomes larger, and consequently, the allowable value for processing signal charges in the horizontal register must be set to be larger for smoothly transferring the mixed signal charges. In this method, however, since all of the mixed signal charges or the portion thereof exceeding the allowable value are discharged into the drain region, the amount of signal charges required to be transferred in the horizontal register can be reduced. As a result, there can be eliminated the necessity of excessively increasing the allowable value for processing signal charges in the horizontal register.

According to a further preferred mode of the present invention, there is provided a method of driving a solid state imaging device, wherein a drain region is provided in the horizontal register on the side opposite to the image area. In this method, a signal in accordance with a small aspect ratio is outputted by the steps of transferring signal charges for the n-th line by vertical registers; discharging part or all of signal charges in an unnecessary portion on the side far from the output end of the horizontal register into the drain region; transferring signal charges for the (n+1)-th line into the horizontal register by vertical transfer for mixing in the horizontal register the remaining portion of the signal charges in the unnecessary portion on the side far from the output end of the horizontal register with signal charges in an unnecessary portion on the side near the output end of the horizontal register for the (n+1)-th line; and transferring and discharging the mixed signal charges.

In this method, the transfer by the horizontal register for discharging signal charges in unnecessary portions may be carried out only at the rear side of the horizontal blanking period, and since signal charges in the unnecessary portion on the side near the output end of the horizontal register are transferred to the output end section by the horizontal register and can be discharged into the drain region before vertical transfer, even when they are mixed with signal charges on the unnecessary portion on the side near the output end of the horizontal register for the next line, the amount of the mixed signal charges are not excessively increased, thus suppressing a trouble in that the signal charges overflow the vicinity of respective bits.

According to still a further preferred mode of the present invention, there is provided a method of driving a solid state imaging device, wherein an optical black area is provided so as to be adjacent to an output side in horizontal transfer in an image area, and a horizontal register includes a first horizontal register portion corresponding to the image area and a second horizontal portion corresponding to the optical black area, the second horizontal register portion being connected to the output end of the first horizontal register portion and being connected at its output end side an output stage including a charge detecting portion. In this method, a signal in accordance with a small aspect ratio is outputted by the steps of outputting signal charges in a necessary portion for the n-th horizontal line through the first and second horizontal register portions; transferring unnecessary signal charges on the side far from the output end of the horizontal register up to the output end of the second horizontal register portion; stopping the first horizontal register portion and driving the second horizontal register portion to discharge the unnecessary signal charges in the second horizontal register portion; transferring signal charges in the image area and the optical black area for the (n+1)-th horizontal line into the first and second horizontal register portions by the vertical registers for mixing the unnecessary signal charges remaining in the output end of the first horizontal register portion with unnecessary signal charges on the side near the output end of the horizontal register for the (n+1)-th horizontal line; driving the first and second horizontal register portions to output the signal charges in the optical black area; and discharging the mixed signal charges until ending of the horizontal retrace period and transferring the necessary signal charges such that the head thereof reaches the output end of the horizontal register.

According to this method, in the state that unnecessary signal charges on the side opposite to the output end of the horizontal register for the n-th horizontal line remain in the output end section of the second horizontal register portion, signal charges for the (n+1)-th horizontal line are transferred into the first horizontal register portion, so that signal charges in the optical black area are taken in and the above unnecessary signal charges are mixed with the unnecessary charges on the side of the output end of the horizontal register for the (n+1)-th horizontal line. After that, the first horizontal register portion is driven to take out the signal charges in the optical black area (signal charges representing a black level) and then the mixed signal charges are discharged.

As a result, the drive frequency of the horizontal register for discharging unnecessary signal charges can be reduced to be half, and further the black level in the horizontal period can be detected.

The above and other objects, feature and advantages of the present invention will be apparent from the following detailed description of the preferred embodiments of the invention in conjunction with the accompanying drawings.

BRIEF DESCRIPTION OF THE DRAWINGS

FIG. 1B is a time chart showing a horizontal blanking pulse and a horizontal drive pulse for driving a horizontal register in the first embodiment;

FIG. 1C is a diagram illustrating the flow of signal charges in the horizontal register at the mode of the aspect ratio of 4:3 in the first embodiment;

FIG. 5 is a time chart showing the operation of the horizonal register at the 16:9 mode and the 4:3 mode in the forth embodiment;

FIG. 6B is a time chart showing a horizontal blanking pulse and a horizontal drive pulse for driving the horizontal register in the prior art solid state imaging device shown in FIG. 6A.

DETAILED DESCRIPTION OF THE PREFERRED EMBODIMENTS

Hereinafter, preferred embodiments of the present invention will be described with reference to the accompanying drawings.

First Embodiment

Figure 1A:
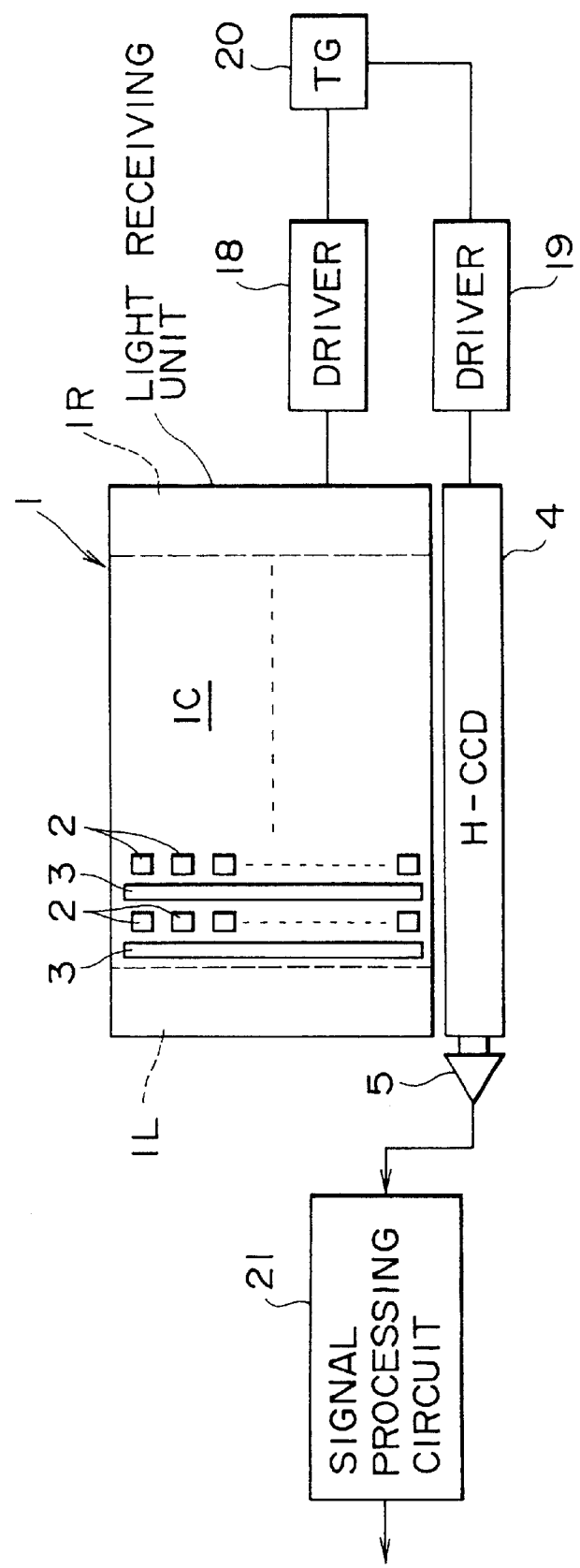
FIG. 1A is a view showing the schematic configuration of a solid state imaging device used in a first embodiment of a method of driving a solid state imaging device according to the present invention.

A first embodiment of the present invention is shown in FIGS. 1A to 1C. FIG. 1A is a plan view showing the schematic configuration of a solid state imaging device; FIG. 1B is a time chart showing a horizontal blanking pulse, and a horizontal drive pulse for driving a horizontal register; and FIG. 1C is a view illustrating the flow of signal charges in the horizontal register in the mode of the aspect ratio of 4:3.

In these figures, reference numeral 1 designates an image area in which light receiving elements 2, . . . , 2 are arranged in a matrix. Reference numeral 3 designates a vertical register provided in the image area 1 for each vertical line of the light receiving elements, which is adapted to vertically transfer signal charges from the light receiving elements in the vertical line.

The light receiving elements 2, . . . , 2 and the vertical registers 3, . . . , 3 are arranged in accordance with the aspect ratio of 16:9. Specifically, in this embodiment, the number of effective pixels in the horizontal direction is 948 while the number of effective pixels in the vertical direction is 486. The effective pixels in the number of 948×486 are to be all reproduced in the mode of the aspect ratio of 16:9. On the other hand, in the mode of an aspect ratio of 4:3, signal charges in the left side unnecessary portion 1L and the right side unnecessary portion 1R in the image area are discharged as unnecessary signal charges. The signal charges from a middle portion 1C are not discharged even in the mode of the aspect ratio of 4:3. Each of the left side unnecessary portion 1L and the right side unnecessary portion 1R has a width being about one-eighth of the total width of the image area 1. The middle portion 1C has a width being about three-forth of the total width of the image area 1.

Reference numeral 4 designates a horizontal register provided on the lower side of the image area 1 for horizontally transferring signal charges vertically transferred from the vertical registers 3, . . . , 3. Reference numeral 5 designates an output section provided at the output end of the horizontal register 4 for converting signal charges into electrical signals (voltages) and outputting the electrical signals to the exterior. The output section 5 also serves as means for discarding signal charges outputted from the horizontal register 4.

Reference numeral 21 designates a signal processing unit for processing a signal converted into a voltage at the output section 5. A TV signal and the like are formed at the signal processing unit 21. The vertical register 3 and the horizontal register 4 are controlled to be driven by drivers 18, 19, respectively. Reference numeral 20 designates a timing generator for controlling the drivers 18, 19.

Next, the operation of the CCD solid state imaging device will be described with reference to FIGS. 1B and 1C.

In the mode of the aspect ratio of 16:9, as in the usual CCD solid state imaging device, horizontal transfer by the horizontal register 4 is carried out during the horizontal scanning period. At this time, the frequency of a horizontal drive pulse for driving the horizontal register 4, that is, the horizontal drive frequency is, for example, 18 MHz. During the horizontal blanking period, vertical transfer for signal charges by the vertical registers 3, . . . , 3 is carried out. By such one transfer, signal charges in the vertical registers 3, . . . , 3 on one horizontal line are transferred to the horizontal register 4.

In the mode of the aspect ratio of 4:3, the operation is complicated more than in the 16:9 mode. After one horizontal scanning is ended and the horizontal blanking is started (t1: starting time of the horizontal blanking period), vertical transfer is intermediately carried out. The state of the horizontal register 4 at the time when the vertical transfer is ended (t2: ending time of vertical transfer) is shown in (1) of FIG. 1C. In this state, signal charges in one horizontal line (the n-th line) are all stored in the horizontal register 4. Accordingly, signal charges L1 in the left side unnecessary portion 1L are stored in the output end portion; signal charges C1 in the necessary portion 1C are stored in the middle portion; and signal charges R1 in the right side unnecessary portion 1R are stored in the side opposite to the output end section.

The solid state imaging device in this embodiment is largely different from the prior art CCD solid state imaging device shown in that the vertical transfer is carried out directly after the horizontal blanking is started, that is, the transfer for discharging signal charges in the unnecessary portion is not carried out at the front side of the horizontal blanking period.

After the vertical transfer is ended, the horizontal register 4 performs the transfer for discharging signal charges in the unnecessary portion before the horizontal blanking is ended (t3: ending time of the horizontal blanking). The transfer of the horizontal register is carried out by a horizontal drive pulse of the frequency of, for example, 27 MHz. The state of the horizontal register 4 at the ending time t3 of the horizontal blanking period is shown by (2) in FIG. 1C. As is apparent from the figure, at this time, the signal charges L1 in the unnecessary portion are discharged from the horizontal register, and the signal charges C1 in the necessary portion wait for the transfer to the output section 5. The signal charges R1 in the right side unnecessary portion 1R follow the rear side (on the right side) of the signal charges C1 in the necessary portion.

After the horizontal blanking is ended, the horizontal scanning is started, so that the signal charges C1 in the necessary portion 1C are transferred to the horizontal register 4. Namely, the original horizontal transfer is carried out. The transfer of the horizontal register is carried out by the horizontal drive pulse of a horizontal drive frequency of 13.5 MHz. The state of the horizontal register 4 at the time (t1) when the horizontal transfer is ended is shown by (3) in FIG. 1C. In such a state, the signal charges R1 in the right side unnecessary portion 1R are positioned at the output end section of the horizontal register 4.

As the horizontal blanking is started, the vertical transfer is carried out, so that signal charges in the next horizontal line (the (n+1)-th line) are transferred from the vertical registers 3, . . . , 3 into the horizonal register 4. The state of the horizontal register 4 at the time t2 when the vertical transfer (t1–t2) is ended is shown by (4) in FIG. 1C.

As is apparent from the figure, the signal charges L2 in the left side unnecessary portion 1L for the (n+1)-line are transferred to the output end section of the horizontal register 4, and are then mixed with the signal charges R1 in the right side unnecessary portion 1R for the n-th line already stored therein.

In addition, signal charges C2 in the necessary portion for the (n+1)-th line are transferred to the middle portion of the horizontal register 4, and signal charges R2 in the right side unnecessary portion for the (n+1)-th line are transferred to the side opposite to the output end section of the horizontal register 4. After the vertical transfer is ended, horizontal transfer for discharging the mixed signal charges (R1+L2) in the unnecessary portions is carried out. The state of the horizontal register 4 at the time t3 when the horizontal transfer for discharging the signal charges (R1+L2) is ended is shown by (5) in FIG. 1C. This is the same as the state shown by (3) in FIG. 1C, except that the signal charges in the n-th line are stored in (3) while the signal charges in the (n+1)-th line are stored in (5)). After that, the original horizontal transfer is carried out. Such an operation is repeated.

According to such a drive method, in the mode of the small aspect ratio of 4:3, the signal charges R1 in the right side unnecessary portion 1R on the side far from the output end of the horizontal register 4 for the n-th horizontal line are mixed with the signal charges L2 in the left side unnecessary portion 1L on the side near the output end of the horizontal register 4 for the (n+1)-th horizontal line, and the mixed signal charges (R1+L2) are discharged. Thus, it is not required to perform the horizontal transfer for discharging signal charges in the unnecessary portion directly after starting the horizontal blanking period. In other words, driving of the horizontal register 4 for discharging the signal charges in the unnecessary portion may be carried out only at the rear side of the horizontal blanking period. Consequently, the horizontal drive frequency for discharging signal charges in the unnecessary portion can be reduced from the conventional value, 54 MHz to the half, 27 MHz.

This makes it possible to reduce the unnecessary radiation, to lower the probability in generating a failure in transfer of the horizonal register, and to eliminate the necessity of excessively increasing the transfer speed of the horizontal register.

As a variation of the above drive method for the CCD solid state imaging device, the horizontal drive frequency for discharging signal charges in the unnecessary portion is not changed from the conventional one, and instead, a time required for discharging signal charges in the unnecessary portion for each horizontal blanking period may be made half (which makes longer the vertical transfer time). As a result, the unnecessary radiation generating time in each horizontal period can be shortened, and thereby the probability in generating a failure due to the unnecessary radiation can be reduced.

Second Embodiment

Figure 2A:
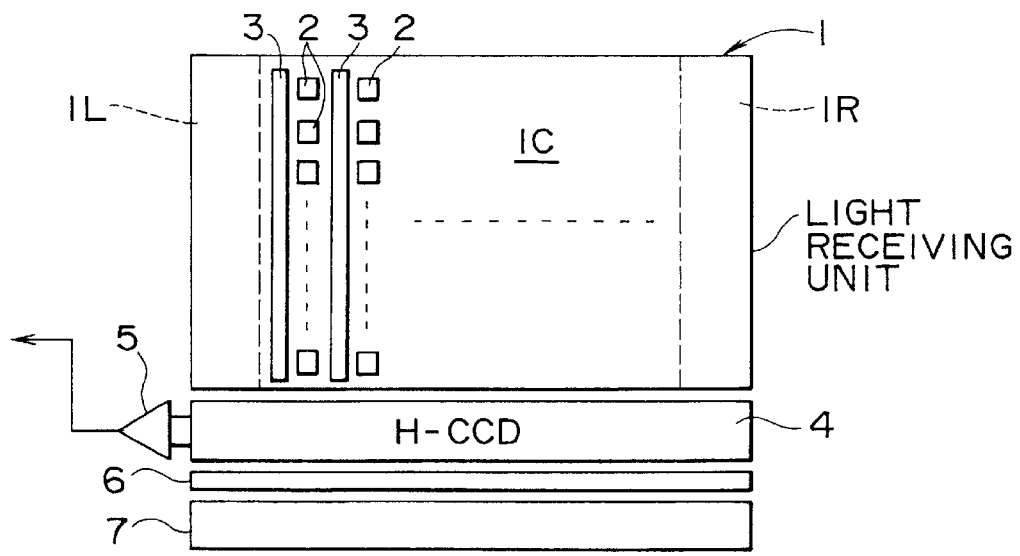
FIG. 2A is a plan view of a solid state imaging device used in a second embodiment of the method of driving a solid state imaging device according to the present invention.
Figure 2B:
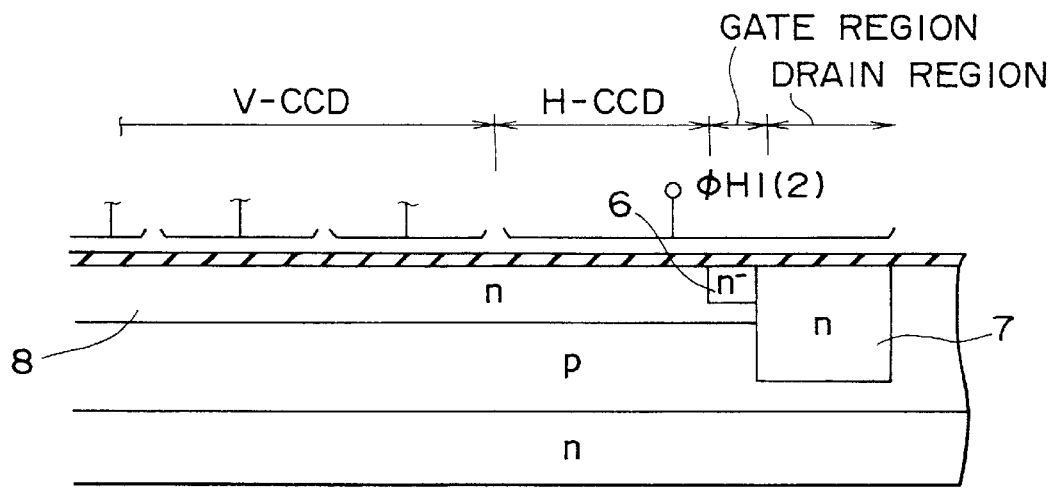
FIG. 2B is a sectional view showing a drain region, gate region and the like in the second embodiment.
Figure 2C:
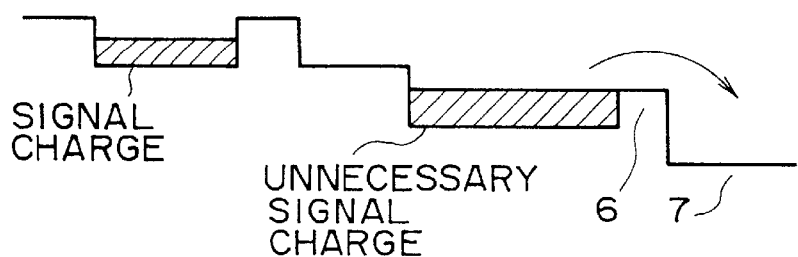
FIG. 2C is a diagram showing a potential profile at a portion shown in FIG. 2B upon discharge of unnecessary charges into the drain region in the second embodiment.

A second embodiment of the present invention is shown in FIGS. 2A to 2C. FIG. 2A is a plan view of a solid state imaging device; FIG. 2B is a sectional view showing a drain region and a gate region; and FIG. 2C is view showing a potential profile of a portion shown in FIG. 2B upon discharge of unnecessary charges to the drain region.

The CCD solid state imaging device in this embodiment has a gate region 6 on the side opposite to the image area relative to a horizontal register 4, and also has a drain region 7 on the side opposite to the horizontal register relative to the gate region 6. This solid state imaging device has the same configuration as that described in the first embodiment shown in FIG. 1A, except that part of signal charges in unnecessary portions mixed in the horizontal register 4, specifically, excessive signal charges are discharged into the drain region 7 through the gate region 6. Accordingly, parts corresponding to those in the first embodiment are designated at the same characters and the description thereof is omitted.

In the gate region 6, a potential barrier is provided by forming an n-type semiconducting region on the surface layer of a horizontal transfer channel (n-type) 8 using ion implantation or the like. The drain region 7 is an n-type semiconducting region formed so as to be adjacent to the gate region 6. A horizontal transfer electrode serves as a gate electrode for discharging signal charges from the horizontal register 4 to the drain region 7. The height of the potential barrier is determined such that signal charges exceeding an allowable value overflow to the drain region 7 side.

The driving of this solid state imaging device is carried out in the same manner as that in the first embodiment, except that when signal charges in the unnecessary portions mixed at the output end section of the horizontal register 4 (R1+L2, see the state shown by (4) in FIG. 1C) exceed the height of the potential barrier of the gate region 6, the excessive part of the signal charges flow in the drain region 7, to be thus discharged. As a result, the transfer by the horizontal register 4 may be carried out only for discharging the remaining part of the unnecessary signal charges (R1+L2), thus eliminating the necessity of excessively increasing the capacity of the horizontal register 4.

Specifically, in the case where the drain region is not provided, when the signal charges R1 in the right side unnecessary portion 1R for one line is mixed with the signal charges L2 on the left side unnecessary portion 1L for the next line, the mixed amount of the signal charges (R1+L2) has a possibility to be significantly increased. In this case, for smoothly transferring the mixed signal charges (R1+L2), that is, for transferring them without any leakage, the capacity of the horizontal register for processing the signal charges must be significantly increased. In the second embodiment, however, since the excessive part of the mixed signal charges overflowing the potential barrier of the gate region 6 are discharged into the drain region 7, the remaining part of the mixed signal charges required to be discharged by the horizontal register 4 can be reduced. As a result, the necessity of increasing the capacity of the horizontal register 4 for processing the signal charges can be eliminated. In this regard, the second embodiment is superior to the first embodiment.

In the solid state imaging device according to this embodiment, any electrode for independently controlling the gate region 6 is not provided; however, such an electrode may be provided for opening/closing the gate on the basis of a control signal. Moreover, a specified direct current bias may be applied to an electrode specialized for the gate region 6 for forming a specified potential barrier by the bias. In this way, various variations may be made for the gate region.

Third Embodiment

Figure 3A:
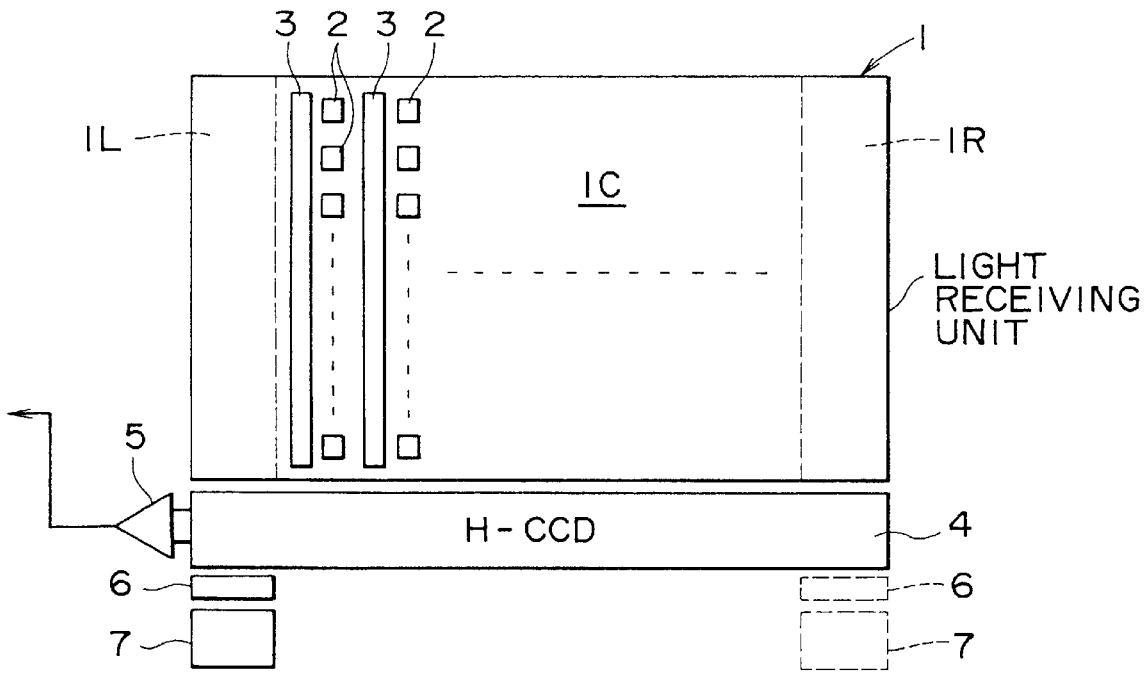
FIG. 3A is a plan view of a solid state imaging device used in a third embodiment of the method of driving a solid state imaging device.
Figure 3B:
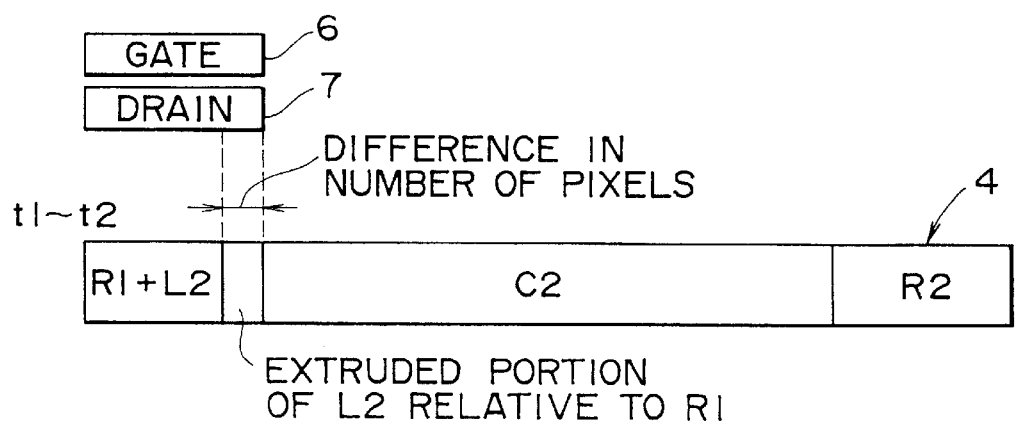
FIG. 3B is a view illustrating the operation of the solid state imaging device shown in FIG. 3A.

A third embodiment is shown in FIGS. 3A and 3B. FIG. 3A is a plan view of a solid state imaging device of this embodiment, and FIG. 3B is a diagram for illustrating the operation of the solid state imaging device.

In this embodiment, a drain region 7 and a gate region 6 are formed only at positions corresponding to the output end section of the horizontal register 4, as shown by the solid line in FIG. 3A. The reason for this is as follows. Only at the output end section of the horizontal register 4, the amount of signal charges is increased by the mixture of the signal charges in the right side unnecessary portion for one line with the signal charges in the left side unnecessary portion for the next line. As a result, the gate region 6 and the drain region 7 are not required to be provided at positions corresponding to the middle portion of the horizontal register 4. Moreover, in the case where the drain region 7 and the like are not provided at the middle portion, signal charges in the necessary portion are not discharged to the drain region 7, an accordingly the design and formation of the gate region 6 and the drain region 7 are allowed to be carried out roughly only in consideration of discharge of unnecessary signal charges.

The gate region 6 is controlled by an independent electrode on the basis of a control signal.

Incidentally, in the mode of 4:3, the number of pixels in the left side unnecessary portion 1L is sometimes different from that in the right side unnecessary portion 1R. Specifically, as shown in FIG. 3B, in some cases, the left side unnecessary portion is larger in the number of pixels than the right side unnecessary portion. In this case, after the horizontal transfer for signal charges in the necessary portion during the horizontal scanning period is ended, the signal charges R1 on the right side unnecessary portion are excessively transferred by a difference in pixels for allowing the head of the signal charges R1 to be located at the output end of the horizontal register 4.

In the case where the gate electrode 6 is opened/closed on the basis of a control signal, the gate is only opened in the vertical transfer period. Accordingly, after the horizontal transfer for the signal charges in the necessary portion 1C for one line is ended, part or all of the signal charges in the right side unnecessary portion 1R for the line are discharged into the horizontal register 7 before vertical transfer, and then signal charges for the next line are transferred from the vertical registers into the horizontal register 4. As a result, even when signal charges in the left side unnecessary portion 1L for the new line are stored into the output end section of the horizontal register 4, the amount of the signal charges therein is not excessively increased.

As shown by the broken line in FIG. 3A, in the horizontal register 4, the drain region 7 and the gate region 6 may be formed even at the end section opposite to the output end section. Thus, part or all of signal charges in the right side unnecessary portion 1R to be mixed with the signal charges in the left side unnecessary portion 1L at the output end section of the horizontal register 4 can be discharged into the gate region 6 through the drain region 7. Consequently, even when the signal charges in the unnecessary portions are mixed at the output end section of the horizontal register 4, the possibility that the signal charges overflow into portions other than the drain region 7 can be perfectly prevented.

Fourth Embodiment

Figure 4A:
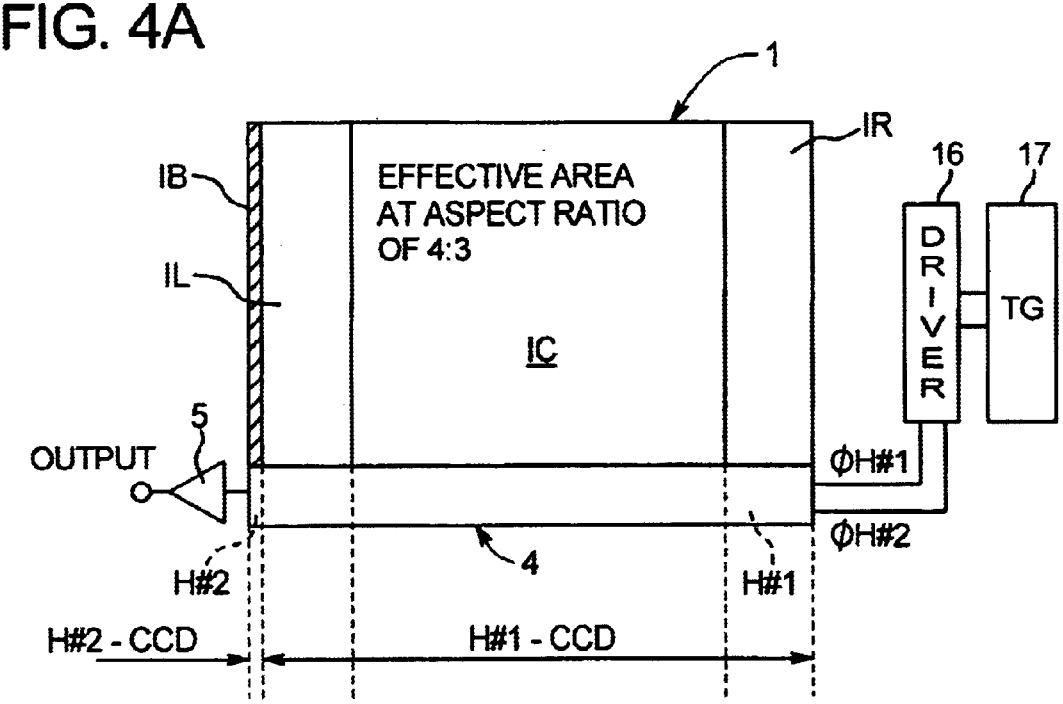
FIG. 4A is a plan view of a solid state imaging device used in a forth embodiment of the method of driving a solid state imaging device according to the present invention.
Figure 4B:
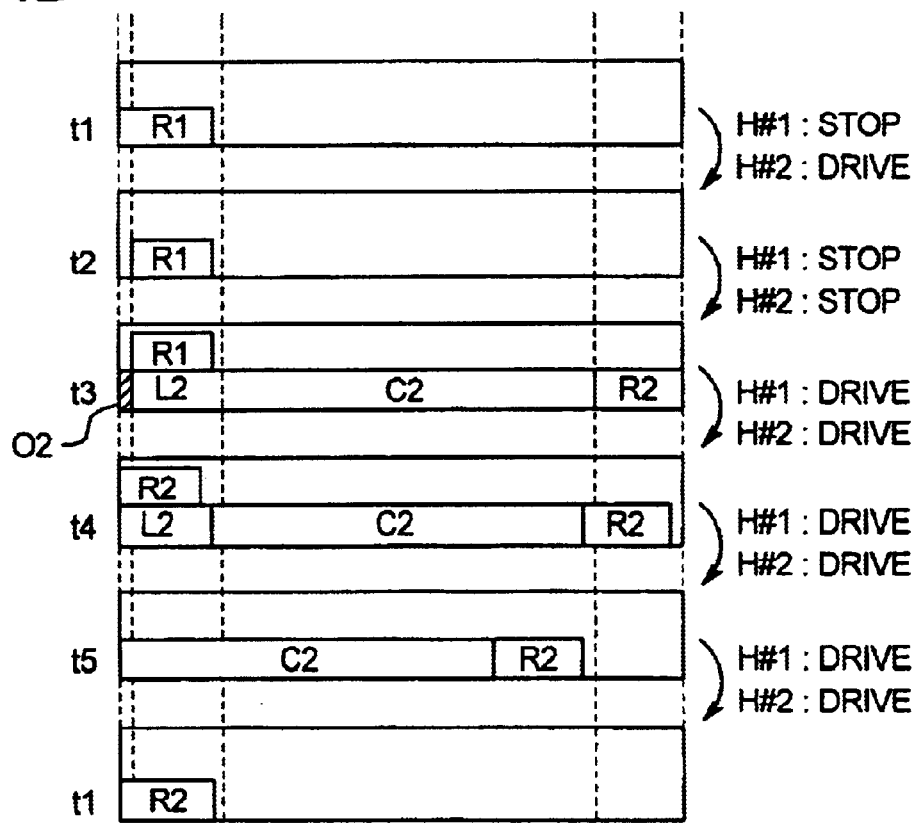
FIG. 4B is a diagram illustrating the flow of signal charges in a horizontal register at the 4:3 mode in the forth embodiment.
Figure 6A:
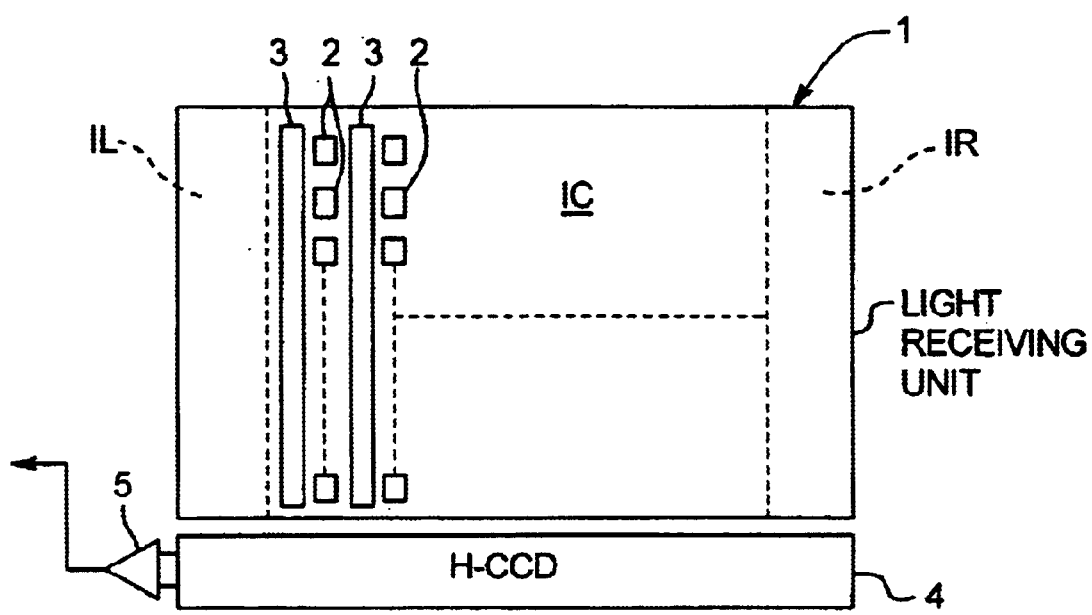
FIG. 6A is a plan view showing the schematic configuration of a prior art aspect ratio variable solid state imaging device.

A forth embodiment is shown in FIGS. 4A, 4B and 5. FIG. 4A is a plan view of a solid state imaging device in this embodiment, and FIG. 4B is a diagram illustrating the flow of signal charges in the horizontal register in the mode of 4:3. FIG. 5 is a time chart illustrating the operation of the horizontal register in the mode of 16:9 and the mode of 4:3.

In this embodiment, a black level is detected for each horizontal period, and a dark current component is deleted from a signal.

In each of the above-described embodiments, the horizontal drive frequency for discharging unnecessary signals in the horizontal register in an aspect ratio variable solid state imaging device can be reduced to be for example half the conventional one; however, the detection of a black level for deleting a black level from a signal is not carried out.

In this embodiment, an attempt has been made for detecting a black level for each field period by provision of an optical black area on the upper or lower side of the image area. This is because, for detecting a black level for each horizontal period even in the mode of 4:3, it is required to provide a vertical optical black area adjacently to the left or right side of the necessary portion 1C of the image area (effective area in the mode of 4:3); however, such provision seems to be inconvenient because it obstructs the imaging in the mode of 16:9.

In the case where an optical black area is provided on the upper or lower side of the image area for detecting a black level, however, the detection is carried out only for each field period. Specifically, the detection period is quite longer than the horizontal period (525/2 times the horizontal period in the case of the NTSC type), so that noise appears in a low frequency side when a black signal is clamped.

In the solid state imaging device, particularly, in a FIT (Frame Interline) type CCD solid state imaging device, a dark current in a screen is not constant, that is, a variation in the dark current along the vertical direction is significantly large. Specifically, in the FIT type CCD solid state imaging device, a dark current is produced mainly in an accumulation area, and the time required for the presence of charges in the accumulation area differs for each line. As a result, on the horizontal line in the upper side of the screen, the above time is in the order of several H, and thereby the dark current is relatively low. On the contrary, on the horizontal line in the upper side of the screen, the time required for the presence of charges in the accumulation area is made longer, and thereby the dark current is significantly larger.

In view of the foregoing, in this embodiment, an attempt has been made to detect a black level in the horizontal period either in the mode of 16:9 or in the mode of 4:3 in the aspect ratio variable solid state imaging device.

The first feature of the solid state imaging device in this embodiment lies in that an optical black area 1B is provided adjacently to the left side of the image area 1, specifically, in the mode of 4:3, it is provided adjacently to the left side of the unnecessary portion 1L on the output end side in horizontal transfer.

The second feature lies in that the horizontal register 4 is divided into two parts, a first horizontal register portion H#1-CCD, and a second horizontal register portion H#2-

CCD. The first horizontal register portion H#1-CCD is provided in accordance with the image area; while the second horizontal register portion H#2-CCD is provided in accordance with the optical black area 1B.

The first and second horizontal register portions H#1-CCD and H#2-CCD are independently controlled by a driver 16. Each of reference numeral φH#1, φH#2 designates a drive pulse. Reference numeral 17 designates a timing generator for controlling the driver 16. An output section 5 including a floating diffusion reset transistor and a buffer is connected to the output end of the second horizontal register portion H#2-CCD for outputting a signal through the output section 5.

For simplicity, the description is made such that the number of packets of the second horizontal register portion H#2-CCD corresponds to the number of pixels in the horizontal direction in the optical black area. However, actually, the so-called empty transfer may be added.

Next, the operation of the solid state imaging device in this embodiment will be described. In the 16:9 mode, the first and second horizontal register portions H#1-CCD, H#2-CCD are operated in the same manner. This is substantially the same as the operation of the CCD solid state imaging device with an optical black area.

Specifically, directly before the horizontal blanking period is ended, signal charges (unnecessary charges are not present in the 16:9 mode) in the image area 1 (1R, 1C, 1L) and in the optical black area 1B are transferred from the vertical registers into the horizontal register 4 (H#1-CCD and H#2-CCD), and a signal from the optical black area 1B is outputted.

Then, after the horizontal blanking period is ended, the signal charges from the image area 1 are horizontally transferred.

Next, the operation in the mode of 4:3 will be described with reference to FIG. 4B and FIG. 5.

In this mode, each horizontal blanking period is divided into four terms. First, there will be described the state at the starting time t1 (the starting time in the first term) of each horizontal blanking period. In such a state, the output of signal charges in the necessary portion 1C for the n-th horizontal line is ended, and signal charges R1 in the right side unnecessary portion 1R for the line stored at the output end section of the horizontal register are ready to be discharged.

During a term from t1 to t2, that is, during the first term, the first horizontal register portion H#1-CCD is stopped and the second horizontal register portion H#2-CCD is driven for discharging the above unnecessary charges R1. The second horizontal register portion H#2-CCD is thus emptied. The above discharge is carried out by transfer at a double speed.

Next, during a term from t2 to t3, that is, during the second term, signal charges for the (n+1)-th line are transferred from the vertical registers into the horizontal register 4.

At this time, the first and second horizontal register portions H#1-CCD and H#2-CCD are stopped.

By such a transfer, the signal charges R1 from the right side unnecessary portion 1R for the n-th line are mixed with the signal charges L2 from the left side unnecessary portion 1L for the (n+1)-th line. Of course, by the transfer, signal charges from the optical black area 1B, that is, signal charges representing a black level are taken in the horizontal register 4 (H#1-CCD, H#2-CCD). In addition, to prevent the amount of charges increased by the mixture of the unnecessary charges R1 and L2 from exceeding the allowable value of the horizontal register 4, it is desirable to limit the mount of the charges using a limiter.

Next, during a term from t3 to t4, that is, during the third term, the signal charges from the optical black area 1B, that is, the signal charges representing a black level are outputted by horizontal transfer of the horizontal register 4. In addition, the term is as very short as 1 μsec.

The signal charges representing the black level is read out, which can be used for the deletion of a dark current component from the signal. In this term, the first and second horizontal register portions are both operated.

During a term from t4 to t5, that is, during the fourth term, the mixed unnecessary charges (R1+L2) are discharged by horizontal transfer of the horizontal register 4. The discharge is ended at the ending time t5 of the horizontal blanking period. At the ending time t5, the signal charges C2 in the necessary portion 1C for the (n+1)-th line are transferred such that the head thereof reaches the output end of the horizontal register 4, and are ready to be outputted.

After the horizontal blanking is ended, the output of the signal charges C2 in the necessary portion 1C is started. The transfer of the signal charges C2 for the horizontal line is ended until the next horizontal blanking period is started. The above-described operation is repeated from the ending time t1 of the transfer.

According to such a drive method, in the state that the unnecessary signal charges R1 on the side opposite to the output end for the n-th line remain at the output end section of the first horizontal register portion H#1-CCD, the signal charges for the (n+1)-th line are transferred in the first horizontal register portion H#1-CCD, so that signal charges in the optical black area are taken in and the unnecessary signal charges R1 are mixed with the unnecessary signal charges L2 on the output end side for the (n+1)-th line. After that, the first and second horizontal register portions H#1-CCD and H#2-CCD are driven for outputting the signal charges in the optical black area 1B (that is, the signal charges representing a black level), followed by discharging the mixed unnecessary charges (R1+L2).

Consequently, the drive frequency for deleting unnecessary signal charges in the horizontal register can be reduced to be half, and at the same time, a black level can be detected for each horizontal period.

In this embodiment, the number of the operations to be carried out in the horizontal blanking period is increased by two operations, as compared with the first, second, and third embodiments. The first operation is adapted to delete the unnecessary charges R1 from the horizontal register portion H#2-CCD, and it takes only about 1 μsec. On the other hand, the second operation is adapted to read out a black level from the optical black area, which is necessarily required to delete at least a dark current component. This takes only 0.5 sec. As a result, the rate of increasing the drive frequency depending on an increase in the number of operations is small.

In each of the above-described embodiments, the present invention is applied to the interline type CCD solid state imaging device; however, the present invention may be applied to the frame interline type CCD solid state imaging device. Moreover, in each of the first, second, and third embodiments, one piece of the horizontal register is used; however, the present invention may be applied to the CCD solid state imaging device having two pieces of the horizontal registers.

It is to be noted that signal charges in the necessary portion 1C are essentially transferred in the horizontal scanning period; however, actually, they are transferred (read out) by a very small amount even in the horizontal blanking period. In the embodiment, for simplicity, the description has been made such that signal charges are never read out in the horizontal blanking period.

While the preferred embodiments of the present invention have been described using specific terms, such description is for illustrative purposes only, and it is to be understood that changes and variations may be made without departing from the spirit or scope of the following claims.

What is claimed is:

1. A method of driving a solid state imaging device comprising a plurality of pixels arranged in a matrix for generating signal charges, a plurality of vertical registers for transferring said signal charges generated in said pixels in a vertical direction, at least one horizontal register for transferring said signal charges transferred from said vertical registers in a horizontal direction, and an output section connected to an end of said horizontal register for receiving said signal charges from said horizontal register and outputting electrical signals corresponding to said signal charges, said pixels constituting an image area divided into at least three portions, a first portion at a side near said output section in a horizontal direction, a second portion at a side far from said output section in a horizontal direction and a third portion between said first and second portions, said method comprising:

a step of transferring a line of said signal charges from said vertical registers to said horizontal register wherein first unnecessary signal charges generated in said first unnecessary portion are stored in a first side portion of said horizontal register, necessary signal charges generated in said necessary portion are stored in a middle portion of said horizontal register, and second unnecessary signal charges generated in said second unnecessary portion are stored in a second side portion of said horizontal register opposite to said first side portion, a step of transferring said first unnecessary signal charges to said output section, a step of transferring said necessary signal charges to said output section and transferring said second unnecessary signal charges to said first side portion, a step of mixing said second unnecessary signal charges and first unnecessary signal charges of a next line; transferring the next line of said signal charges to said horizontal register, a step of transferring said mixed first and second unnecessary signal charges to said output section; and draining an excess of said mixed signal charges.

2. A method according to claim 1, wherein said solid state imaging device further comprises an optical black area at the edge of said image area adjacent an output side for generating signal charges representing a black reference.

3. A method according to claim 2, wherein said horizontal register is divided into a first register portion corresponding to said image area and second register portion corresponding to said optical black area, and said first and second register portions are driven independently.

4. A method according to claim 3, further comprising a step of transferring a portion of said first unnecessary signal charges to said output section and transferring said signal charges representing black level to said second register portion.

5. A method of outputting necessary signal charges generated in a central portion of the image area of a solid state imaging device as an image signal, said image area divided into three portions comprising a first edge portion, a second edge portion opposite to said first edge portion, and said central portion arranged between said first and second edge portions, said method comprising the steps of:

combining a first unnecessary signal charges generated in said first edge portion and a second unnecessary signal charges generated in said second edge portion in said horizontal register during a horizontal blanking period, outputting said combined first and second unnecessary signal charges from said horizontal register during said horizontal blanking period;

outputting said unnecessary signal charges from said horizontal register during a horizontal effective period; and draining an excess of said mixed signal changes.

6. A method according to claim 5, wherein said solid state image device further comprises an optical black area at an edge of said image area adjacent an output side for generating signal charges representing a black reference.

7. A method according to claim 6, wherein said horizontal register is divided into a first register corresponding to said image area and a second register portion corresponding to said optical black area.

8. A video camera comprising:

a solid state imaging device including an image area for generating signal charges, a plurality of vertical registers for transferring said signal charges in a vertical direction, at least one horizontal register for transferring said signal charges transferred from said vertical registers in a horizontal direction, an output section for receiving said signal charges from said horizontal register and outputting an electrical signal corresponding to said signal charges, operating means having a first mode for causing said solid state imaging device to output a first electrical signal corresponding to first necessary signal charges derived from a first area within said image area as a first image signal, and second mode for causing said solid state imaging device to output a second electrical signal corresponding to second necessary signal charges derived from a second area within said image area as a second image signal, a width of said second area being narrower than that of said first area, wherein unnecessary signal charges are generated at both edge portions of said image area outside said second area in said second mode, said operating means including means for combining said unnecessary signal charges generated at said both edge portions in said horizontal register during a horizontal blanking period, means for outputting said combined unnecessary signal charges from said horizontal register during said horizontal blanking period, means for outputting said second necessary signal charges from said horizontal register within a horizontal effective period, and means for draining an excess of mixed signal charges.

9. A video camera according to claim 8, wherein said solid state imaging device further comprises an optical black area at an edge of said image area adjacent an output side.

10. A video camera according to claim 9, wherein said horizontal register is divided into a first register portion corresponding to said image area and a second register portion corresponding to said optical black area.

* * * * *